United States Patent
Yang

(10) Patent No.: US 12,545,063 B2
(45) Date of Patent: Feb. 10, 2026

(54) TIRE MOUNTING COMPONENT AND DEVICE, AND TIRE MOUNTING/DISMOUNTING DEVICE

(71) Applicant: Chunhui Yang, Mckinney, TX (US)

(72) Inventor: Chunhui Yang, Mckinney, TX (US)

(73) Assignee: Chunhui Yang, Mckinney, TX (US)

( * ) Notice: Subject to any disclaimer, the term of this patent is extended or adjusted under 35 U.S.C. 154(b) by 0 days.

(21) Appl. No.: 18/598,272

(22) Filed: Mar. 7, 2024

(65) Prior Publication Data

US 2025/0282186 A1  Sep. 11, 2025

(51) Int. Cl.
  *B60C 25/02* (2006.01)
  *B60C 25/04* (2006.01)
  *B60C 25/05* (2006.01)

(52) U.S. Cl.
  CPC .............. *B60C 25/02* (2013.01); *B60C 25/04* (2013.01); *B60C 25/05* (2013.01)

(58) Field of Classification Search
  CPC . B60C 25/0572; B60C 25/04; B60C 25/0503; B60C 25/02; B60C 25/05
  See application file for complete search history.

(56) References Cited

U.S. PATENT DOCUMENTS

| | | | | |
|---|---|---|---|---|
| 3,517,723 A | * | 6/1970 | Hogg | B60C 25/04 157/1.24 |
| 3,717,193 A | * | 2/1973 | Craft | B60C 25/04 157/1.24 |
| 3,847,198 A | * | 11/1974 | Brosene, Jr. | B60C 25/04 157/1.24 |
| 4,403,640 A | * | 9/1983 | Schifferly | B60C 25/04 157/1.3 |
| 6,629,554 B2 | * | 10/2003 | Mimura | B60C 25/138 157/1.24 |
| 7,556,078 B1 | * | 7/2009 | Bassett | B60C 25/04 157/1.22 |
| 2014/0000813 A1 | * | 1/2014 | Story | B60C 25/0563 157/1.24 |
| 2021/0188023 A1 | * | 6/2021 | Brunner | B60C 25/138 |

FOREIGN PATENT DOCUMENTS

KR    100765657 B1 * 10/2007 ........... B60C 25/132

* cited by examiner

*Primary Examiner* — Bryan R Muller
(74) *Attorney, Agent, or Firm* — Timothy T. Wang; Panorama IP Group

(57) ABSTRACT

Embodiments of the present disclosure provide a tire mounting component and device and a tire mounting/dismounting device. The tire mounting component comprises a main body and a pressing member capable of pressing down the tire, and the pressing member is arranged on the main body. A protective member is arranged on the main body, the protective member is at least partially located above the pressing member, and a portion of the protective member that is located above the pressing member can block at least a portion of a top surface of the pressing member. During mounting of the tire, the protective member can prevent an inner edge of the tire from coming into contact with the at least a portion of the top surface of the pressing member to prevent the inner edge of the tire from being stuck on the pressing member.

3 Claims, 4 Drawing Sheets

TIRE MOUNTING COMPONENT AND DEVICE, AND TIRE MOUNTING/DISMOUNTING DEVICE

TECHNICAL FIELD

The present disclosure relates to the field of tire mounting/dismounting devices, and in particular, to a component and tire mounting device, and a tire mounting/dismounting device.

BACKGROUND ART

When it is necessary to replace or repair tired, the tire needs to be mounted/dismounted. If the tire is mounted/dismounted manually, manual operations take a lot of time and require high labor intensity; and it is also difficult to control a manual force during mounting/dismounting, and the tire or a wheel disc is very likely to be damaged due to misoperation, thereby bringing about many disadvantages to people's safety when driving a vehicle. Therefore, an electric tire mounting/dismounting machine has appeared on the market, and electric mounting/dismounting of the tire is used instead of manual mounting/dismounting of the tire, which can improve the tire mounting/dismounting efficiency.

SUMMARY OF THE INVENTION

In order to overcome the shortcomings of the prior art, the present disclosure provides a component and tire mounting device, and a tire mounting/dismounting device.

The present disclosure is implemented by means of the following technical solutions.

In a first aspect, the present disclosure provides a tire mounting component, comprising a main body and a pressing member capable of pressing down the tire, wherein the pressing member is arranged on the main body; a protective member is arranged on the main body, the protective member is at least partially located above the pressing member, and a portion of the protective member that is located above the pressing member is capable of blocking at least a portion of a top surface of the pressing member; and during mounting of the tire, the protective member is capable of preventing an inner edge of the tire from coming into contact with the at least a portion of the top surface of the pressing member to prevent the inner edge of the tire from being stuck on the pressing member.

In a second aspect, the present disclosure provides a tire mounting device, comprising a driving device, a rotating structure, and a tire mounting structure, wherein the tire mounting structure comprises a tire mounting component as described above, the driving device is capable of driving the rotating structure to rotate, the tire mounting structure is arranged on the rotating structure, and the rotating structure is capable of driving the tire mounting structure to rotate.

In a third aspect, the present disclosure provides a tire mounting/dismounting device, comprising a tire dismounting structure and a tire mounting device as described above, wherein the tire dismounting structure comprises a supporting seat and a prying member detachably arranged on the supporting seat; the supporting seat comprises a second mounting portion, a second connecting portion, and a supporting arm, wherein the second mounting portion is arranged on the rotating structure, the second connecting portion is arranged on the second mounting portion, and the supporting arm is arranged on the second connecting portion; and the second connecting portion is provided with a retaining groove capable of transversely retaining the prying member, and baffles each having a length less than that of the supporting arm are arranged on two sides of a top of the supporting arm, and when the prying member is placed at a middle position between the baffles on the two side of the top of the supporting arm, the baffles on the two side of the top of the supporting arm are capable of transversely retaining the prying member.

List of reference signs: 1. Main body; 2. Pressing member; 3. Protective member; 4. Guide member; 5. Reinforcing rib; 6. Driving device; 7. Rotating structure; 8. Tire mounting structure; 9. First mounting portion; 10. First connecting portion; 11. Adjusting structure; 12. Supporting portion; 13. Adjusting member; 14. Housing; 15. Push rod; 16. Roller; 17. Handle; 18. Retaining member; 19. Mounting hole; 20. Electronic operation panel; 21. Tire dismounting structure; 22. Supporting seat; 23. Prying member; 24. Second mounting portion; 25. Second connecting portion; 26. Supporting arm; 27. Retaining groove; 28. Baffle; 29. Fixing structure; 30. Moving ring; 31. Fixing screw; 32. Head; 33. Elongated arm; 34. Handle.

DETAILED DESCRIPTION OF EMBODIMENTS

Specific embodiments of the present disclosure will be described in detail in this section. Preferred embodiments of the present disclosure are illustrated in the accompanying drawings. The accompanying drawings serve to supplement the text description of the specification with figures, providing a visual understanding of each technical feature and the overall technical solution of the present disclosure, but cannot be construed as a limitation to the scope of protection of the present disclosure.

In the description of the present disclosure, it should be understood that orientation or position relationships indicated by terms "upper", "lower", "front", "rear", "left", "right", etc. are orientation or position relationships as shown in the accompanying drawings, and these terms are just used to facilitate description of the present disclosure and simplify the description, rather than indicating or implying that the mentioned device or element must have a specific orientation and must be constructed and operated in a specific orientation, and thus cannot be construed as a limitation to the present disclosure.

In the description of the present disclosure, "several" means one or more, "a plurality of" means two or more, "greater than", "less than", "over", etc. are construed as excluding the number, and "above", "below", "within", etc. are construed as including the number. The terms "first" and "second" in the description are merely intended to distinguish technical features, and cannot be construed as indicating or implying relative importance or implicitly indicating a number of the indicated technical features or implicitly indicating a sequence relationship of the indicated technical features.

In the description of the present disclosure, unless otherwise explicitly defined, the words such as "arrange", "mount" and "connect" should be understood in a broad sense, and those skilled in the art can reasonably determine the specific meanings of the above words in the present disclosure with reference to the specific contents of the technical solutions.

Figure 1:
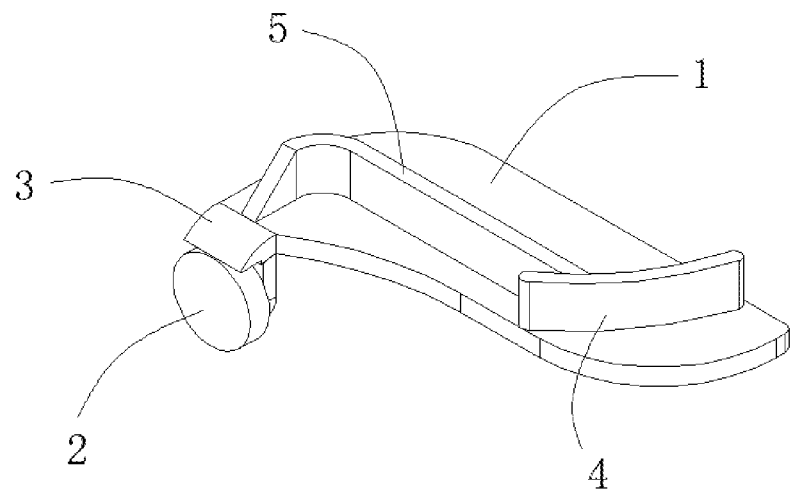
FIG. 1 is a schematic structural diagram of a tire mounting component according to an embodiment of the present disclosure.

Referring to FIG. 1, a tire mounting component according to a preferred embodiment of the present disclosure comprises a main body 1 and a pressing member 2 capable of pressing down the tire. The pressing member 2 is arranged on the main body 1. A protective member 3 is arranged on the main body 1, the protective member 3 is entirely located above the pressing member 2, and a portion of the protective member 3 that is located above the pressing member 2 can block an entire top surface of the pressing member 2. During mounting of the tire, the protective member 3 can prevent an inner edge of the tire from coming into contact with the entire top surface of the pressing member 2 to prevent the inner edge of the tire from being stuck on the pressing member 2.

In an embodiment, the protective member 3 is partially located above the main body 1.

In an embodiment, the portion of the protective member 3 that is located above the main body 1 can block a portion of the top surface of the pressing member 2, and during mounting of the tire, the protective member 3 can prevent the inner edge of the tire from coming into contact with the portion of the top surface of the pressing member 2 to prevent the inner edge of the tire from being stuck on the pressing member 2. In the embodiment of the present disclosure, the shape of the main body 1 is not limited.

In the embodiment of the present disclosure, the portion of the protective member 3 that is located above the pressing member 2 can block the entire top surface or the portion of the top surface of the pressing member 2, and during mounting of the tire, the protective member 3 can prevent the inner edge of the tire from coming into contact with the entire top surface or the portion of the top surface of the pressing member 2 to prevent the inner edge of the tire from being stuck on the pressing member 2, thereby preventing the tire from being damaged due to the fact that the tire is stuck on the pressing member 2, and reducing a degree of damage to the tire during mounting/dismounting of the tire.

In an optional embodiment, the pressing member 2 is a pressing wheel. The pressing wheel can roll during mounting of the tire, which reduces friction and makes the tire mounting process smoother. Moreover, the degree of damage to the tire can be reduced. In an embodiment, the pressing member 2 may be of other suitable structures, and is not limited thereto.

In the embodiment of the present disclosure, the specific structure of the protective member 3 is not limited, and may be configured according to actual requirements. In an optional embodiment, one end of the protective member 3 close to the main body 1 is higher than the other end of the protective member 3 away from the main body 1. An upper surface of the protective member 3 is configured as an outwardly protruding arc-shaped surface. In this way, when the inner edge of the tire comes into contact with the protective member 3, the arc-shaped surface of the protective member 3 provides a guiding effect, so that the inner edge of the tire can slide along the arc-shaped surface of the protective member 3, thereby preventing the inner edge of the tire from being stuck on the pressing member 2, and reducing the degree of damage to the tire during mounting/dismounting of the tire. In an embodiment, the upper surface of the protective member 3 may be configured as an inclined surface.

In an optional embodiment, a guide member 4 capable of guiding the tire is arranged on the main body 1, and a surface of the guide member 4 in contact with the inner edge of the tire is configured as an outwardly protruding arc-shaped surface. In this way, during mounting of the tire, the guide member 4 can fit with the inner edge of the tire well, thus greatly reducing wear of the inner edge of the tire by the guide member 4 and further reducing the degree of damage to the tire during mounting/dismounting of the tire. In an embodiment, the surface of the guide member 4 in contact with the inner edge of the tire may be a flat surface, or the surface of the guide member 4 in contact with the inner edge of the tire may be in other suitable shapes, and is not limited thereto.

In an optional embodiment, a reinforcing rib 5 is arranged on the main body 1, and an end of the reinforcing rib 5 close to the pressing member 2 is bent and extends to the main body 1 close to the protective member 3. In this way, the overall structural strength of the main body 1 is greatly improved, so that the tire mounting component according to the present disclosure is more durable and more reliable. In an embodiment, the reinforcing rib 5 may be configured in other suitable shapes, and is not limited thereto. In an embodiment, it is possible to provide no reinforcing rib 5 on the main body 1.

Figure 2:
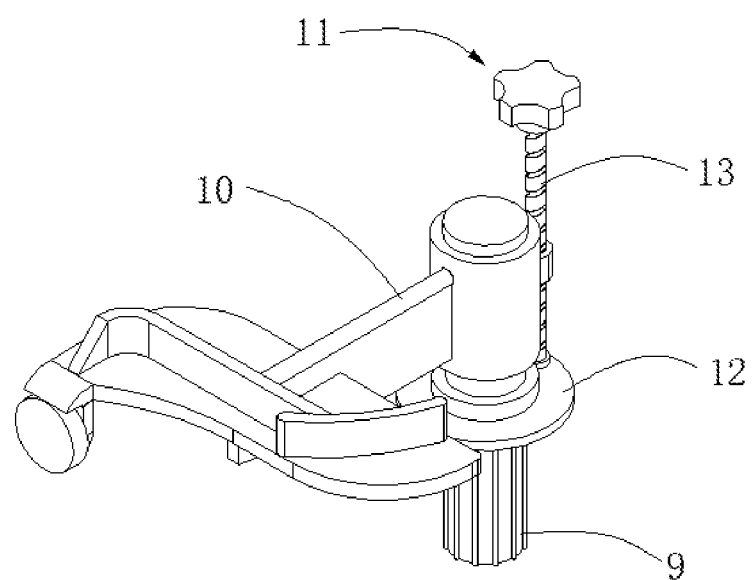
FIG. 2 is a schematic structural diagram of a tire mounting structure according to an embodiment of the present disclosure.
Figure 3:
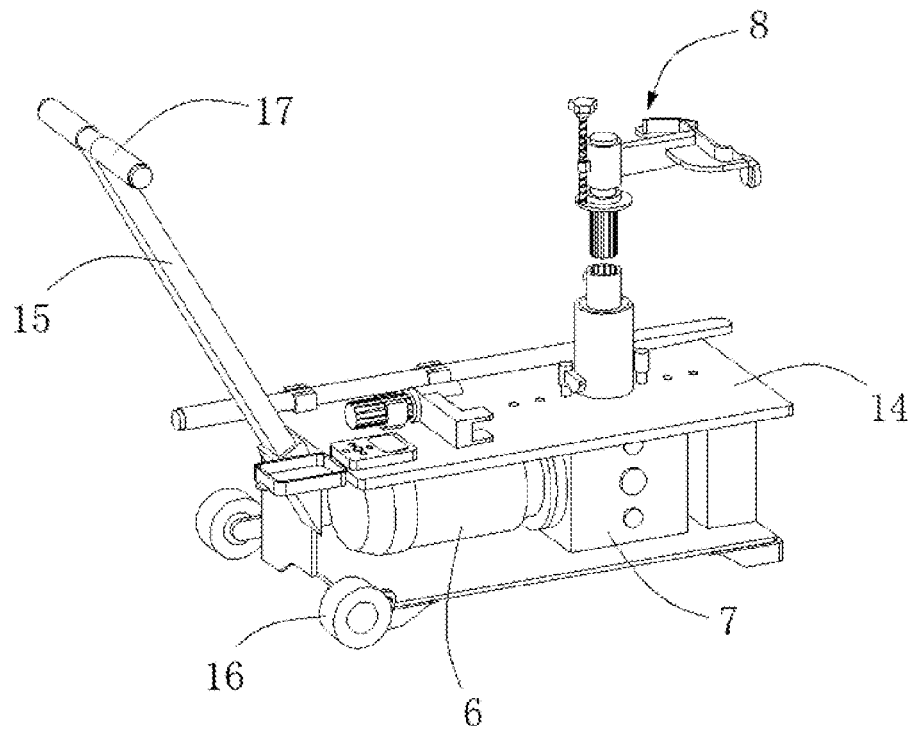
FIG. 3 is a schematic structural diagram of a tire mounting/dismounting device according to an embodiment of the present disclosure.
Figure 4:
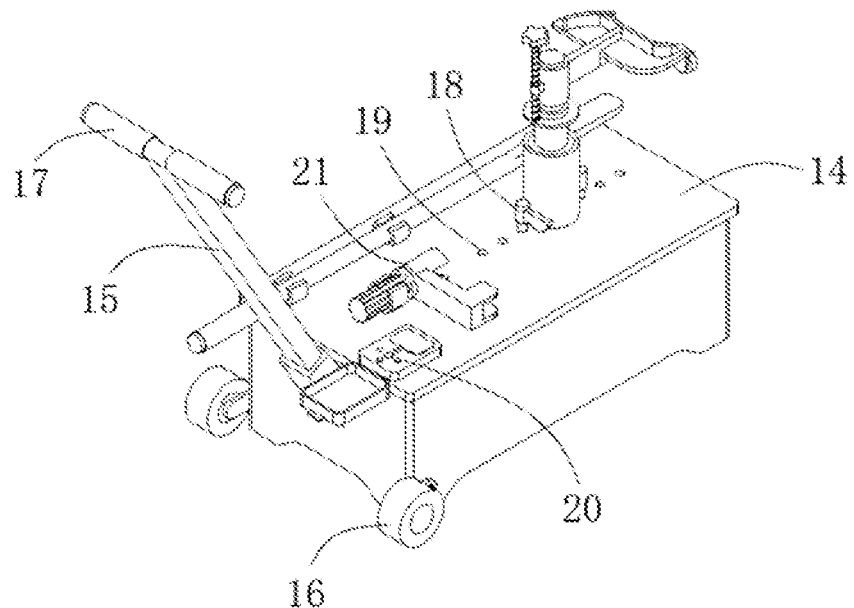
FIG. 4 is a schematic perspective view of a tire mounting/dismounting device according to an embodiment of the present disclosure.

Referring to FIGS. 2 to 4, an embodiment of the present disclosure further provides a tire mounting device, comprising a driving device 6, a rotating structure 7, and a tire mounting structure 8. The tire mounting structure 8 comprises a tire mounting component as described above, the driving device 6 can drive the rotating structure 7 to rotate, the tire mounting structure 8 is arranged on the rotating structure 7, and the rotating structure 7 can drive the tire mounting structure 8 to rotate. With the above structure, during mounting of the tire, the driving device 6 can drive the rotating structure 7 to rotate, and the rotating structure 7 drives the tire mounting component to rotate, thus achieving a function of electrically mounting the tire. The above structure is simple, easy to mount and more convenient to use.

In the embodiment of the present disclosure, the tire mounting structure 8 is not limited, and may be configured according to actual requirements. Referring to FIG. 2, in an optional embodiment, the tire mounting structure 8 comprises a first mounting portion 9, a first connecting portion 10, and an adjusting structure 11. The first mounting portion 9 is arranged on the rotating structure 7, the first connecting portion 10 is longitudinally movably arranged on the first mounting portion 9, the tire mounting component is arranged on the first connecting portion 10, and the adjusting structure 11 can adjust a positional height of the first connecting portion 10. A supporting portion 12 is arranged on the first mounting portion 9. The adjusting structure 11 comprises an adjusting member 13. The adjusting member 13 is arranged on the first connecting portion 10, and a bottom of the adjusting member 13 abuts against the supporting portion 12. The first connecting portion 10 can move in a longitudinal direction of the adjusting member 13 and can be fixed at a current positional height after being adjusted. With the above structure, the positional height of the first connecting portion 10 can be adjusted according to actual requirements, and the positional height of the tire mounting component changes synchronously with the positional height of the first connecting portion 10. When the tire mounting component is adjusted to an appropriate positional height, the process of mounting the tire is easier and more efficient. In addition, with the arrangement of the supporting portion 12, the effect of supporting the adjusting member 13 is achieved, so that the first connecting portion 10 and the tire mounting component each have a more balanced and stable position, thereby making the mounting of the tire easier, more reliable, and more efficient. In an embodiment, it is possible to provide no supporting portion 12 on the first mounting portion 9.

The specific structure of the adjusting structure 11 is not limited, and may be configured according to actual requirements. In an optional embodiment, the adjusting member 13 is provided with an external thread, the first connecting portion 10 is provided with a through hole having an internal thread, and the adjusting member 13 is arranged on the through hole through the cooperation of the external thread and the internal thread. With the above structure, since the first connecting portion 10 and the tire mounting component each have a certain weight, when the adjusting member 13 is rotated, the first connecting portion 10 and the tire mounting component do not move left and right. Under the cooperation of the external thread and the internal thread, the adjusting member 13 is rotated, so that the first connecting portion 10 and the tire mounting component move longitudinally along the adjusting member 13. The above structure is simple to operate and has a high adjustment efficiency.

Referring to FIGS. 3 and 4, in an optional embodiment, the tire mounting device further comprises a housing 14 and a push rod 15. The push rod 15 is arranged on the housing 14, rollers 16 are arranged at a bottom of the housing 14, and the driving device 6, the rotating structure 7 and the tire mounting structure 8 are all arranged on the housing 14. An included angle between the push rod 15 and a horizontal plane is 30°-45°, preferably 35°, and the length of the push rod 15 is 50-90 cm, preferably 78 cm. A handle 17 perpendicular to the push rod 15 is arranged at an end of the push rod 15 away from the housing 14, and the length of the handle 17 is 20-40 cm, preferably 25 cm. By using the above parameters, a worker can push the tire mounting device more easily and more efficiently while keeping his/her body upright. In an embodiment, the included angle between the push rod 15 and the horizontal plane may alternatively be a parameter other than 30°-45°, the length of the push rod 15 may be a parameter other than 50-90 cm, and the length of the handle 17 may be a parameter other than 20-40 cm.

In an optional embodiment, the housing 14 is provided with a retaining member 18 capable of fixing a hub and mounting holes 19 capable of mounting the retaining member 18. One or more retaining members may be provided, and a plurality of mounting holes 19 may be provided. The retaining member 18 can be rotatably mounted on any mounting hole 19. When it is necessary to fix the hub, the retaining member 18 is first mounted on a mounting hole 19 with a suitable size for the hub. After the hub is placed at a designated position, the retaining member 18 is rotated to retain the hub to prevent the hub from deviating, such that the tire can be mounted smoothly. With the above structure, the operation is easy, with a high efficiency and high stability. In an embodiment, other suitable retaining structures may be used instead of the above structure, and are not limited thereto.

In an optional embodiment, the housing 14 may be provided with a plurality of mounting positions, and the plurality of mounting positions are used to mount corresponding components. In this way, each component is stored more easily, and it is convenient to take and use the component. In an embodiment, the housing 14 may be provided with no mounting position described above.

In an optional embodiment, the housing 14 may be provided with an electronic operation panel 20, the electronic operation panel 20 can control and adjust the driving device 6, and the electronic operation panel 20 may also have other function buttons. In this way, the tire mounting device is easier to operate and more efficient. In an embodiment, it is possible to provide no electronic operation panel 20 on the housing 14.

Referring to FIGS. 3 to 7, an embodiment of the present disclosure further provides a tire mounting/dismounting device, comprising a tire dismounting structure 21 and a tire mounting device as described above. The tire dismounting structure 21 comprises a supporting seat 22 and a prying member 23. The prying member 23 is detachably arranged on the supporting seat 22. The supporting seat 22 comprises a second mounting portion 24, a second connecting portion 25, and a supporting arm 26. The second mounting portion 24 is arranged on the rotating structure 7, the second connecting portion 25 is arranged on the second mounting portion 24, and the supporting arm 26 is arranged on the second connecting portion 25. The second connecting portion 25 is provided with a retaining groove 27 capable of transversely retaining the prying member 23, and baffles 28 each having a length less than that of the supporting arm 26 are arranged on two sides of a top of the supporting arm 26. When the prying member 23 is placed at a middle position between the baffles 28 on the two side of the top of the supporting arm 26, the baffles 28 on the two side of the top of the supporting arm 26 can transversely retain the prying member 23. With the above structure, since the prying member 23 needs to be inserted between the inner edge of the tire and the hub during dismounting of the tire, and then rotates along the inner edge of the tire to separate the tire from the hub, the placement of the prying member 23 in the retaining groove 27 and at the middle position between the baffles 28 on the two sides of the top of the supporting arm 26 can well prevent the prying member 23 from loosening and swinging. This can protect the worker and prevent the worker from being injured due to the loosening and swinging of the prying member 23 during dismounting of the tire, and can also make the dismounting of the tire easier and more efficient.

Figure 5:
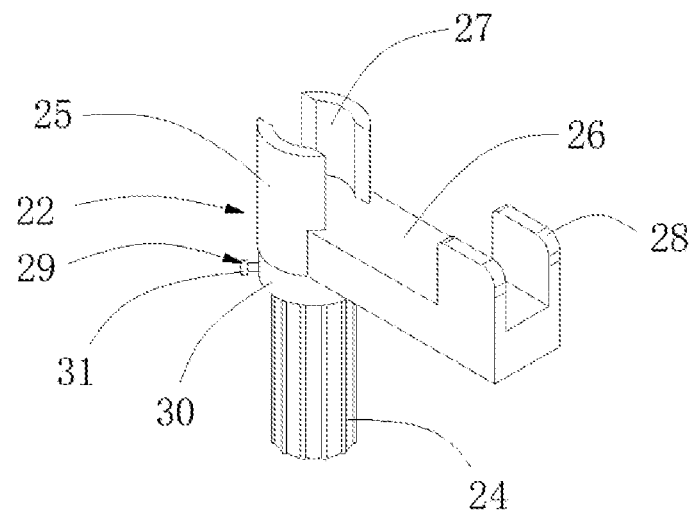
FIG. 5 is a schematic structural diagram of a supporting seat according to an embodiment of the present disclosure.

In the embodiment of the present disclosure, the specific structure of the tire dismounting structure 21 is not limited, and may be configured according to actual requirements. Referring to FIG. 5, in an optional embodiment, the tire dismounting structure 21 comprises a fixing structure 29. When it is necessary to adjust a positional height of the supporting seat 22, the fixing structure 29 is loosened, and the supporting seat 22 can move longitudinally. The fixing structure 29 can fix the supporting seat 22 after the positional height of the supporting seat 22 is adjusted. With the above structure, the positional height of the supporting seat 22 can be adjusted according to actual requirements, and thus the tire dismounting process is easier and more efficient. In an embodiment, the tire dismounting structure 21 may comprise no fixing structure 29.

Further, in the embodiment of the present disclosure, the specific structure of the fixing structure 29 is not limited, and may be configured according to actual requirements. In an optional embodiment, the fixing structure 29 comprises a moving ring 30 and a fixing screw 31. The moving ring 30 is sleeved on the second mounting portion 24, and the moving ring 30 can move longitudinally on the second mounting portion 24. The fixing screw 31 runs through a side wall of the moving ring 30. When it is necessary to adjust the positional height of the supporting seat 22, the fixing screw 31 is rotated, such that the fixing screw 31 is separated from the second mounting portion 24, and thus the positional height of the supporting seat 22 can be adjusted. After the positional height of the supporting seat 22 is adjusted, the moving ring 30 abuts against the rotating structure 7, and the fixing screw 31 is rotated in an opposite direction, such that the fixing screw 31 abuts against the second mounting portion 24, and thus the supporting seat 22 can be fixed. In an embodiment, it is possible to dismount the supporting portion 12 of the first mounting portion 9, mount the supporting portion 12 on the rotating structure 7, and mount the second mounting portion 24 on the supporting portion 12. After the positional height of the supporting seat 22 is adjusted, the moving ring 30 abuts against the supporting portion 12, and the fixing screw 31 is rotated in the opposite direction, such that the fixing screw 31 abuts against the second mounting portion 24, and thus the supporting seat 22 can be fixed. In an embodiment, the fixing structure 29 may alternatively be other suitable structures.

Figure 6:
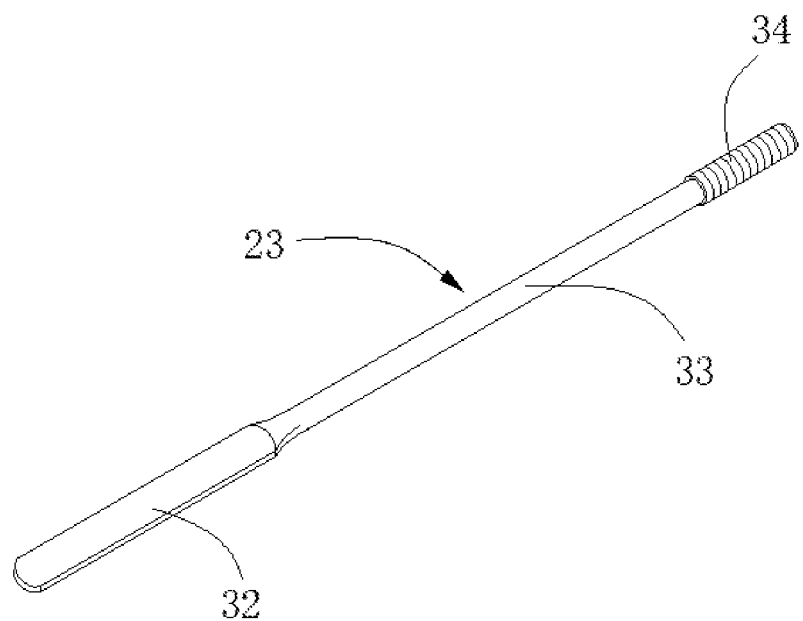
FIG. 6 is a schematic structural diagram of a prying member according to an embodiment of the present disclosure.
Figure 7:
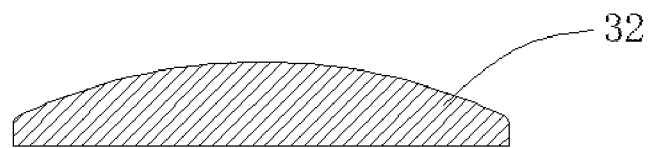
FIG. 7 is a schematic cross-sectional view of a head according to an embodiment of the present disclosure.

In the embodiment of the present disclosure, the specific structure of the prying member 23 is not limited, and may be configured according to actual requirements. Referring to FIGS. 6 and 7, in an optional embodiment, the prying member 23 comprises a head 32 and an elongated arm 33. The head 32 is connected to the elongated arm 33. A surface of the head 32 that abuts against the tire when dismounting the tire is configured as an arc-shaped surface. Since the prying member 23 needs to be inserted between the inner edge of the tire and the hub during dismounting of the tire, and then rotates along the inner edge of the tire to separate the tire from the hub, the surface of the head 32 that abuts against the tire when dismounting the tire is configured as an arc-shaped surface. In this way, the damage to the tire caused by the prying member 23 during dismounting of the tire can be reduced, thereby achieving better safety. In an embodiment, the surface of the head 32 that abuts against the tire when dismounting the tire may be configured as a flat surface, or the surface of the head 32 that abuts against the tire when dismounting the tire may be configured in other shapes, and is not limited thereto.

Referring to FIG. 6, in an optional embodiment, two sides of an end of the head 32 away from the elongated arm 33 are configured in the shape of an outwardly protruding arc. The prying member 23 needs to be inserted between the inner edge of the tire and the hub during dismounting of the tire, and then rotates along the inner edge of the tire to separate the tire from the hub. Therefore, configuring the two sides of the end of the head away from the elongated arm 33 in the shape of an outwardly protruding arc can reduce the damage to the inner edge of the tire and the hub during the insertion of the prying member 23 between the inner edge of the tire and the hub, thereby achieving better safety. In an embodiment, the two sides of the end of the head 32 away from the elongated arm 33 may be in the shape of a corner, or the two sides of the end of the head 32 away from the elongated arm 33 may be configured in other shapes, and is not limited thereto.

In an optional embodiment, a plurality of edges and corners are arranged at a joint between the head 32 and the elongated arm 33, and the size of the joint between the head 32 and the elongated arm 33 is gradually increased from the elongated arm 33 to the head 32. With the above structure, the prying member 23 has a higher overall strength, and is more reliable during dismounting of the tire, thereby achieving higher safety. In an embodiment, no edges and corners may be provided at the joint between the head 32 and the elongated arm 33, or the size of the joint between the head 32 and the elongated arm 33 is constant or gradually reduced from the elongated arm 33 to the head 32, or other suitable structures may be used at the joint between the head 32 and the elongated arm 33, and are not limited thereto.

In an optional embodiment, the prying member 23 is of an integrally formed structure. In this way, the prying member 23 has a higher overall strength, and is more reliable during dismounting of the tire, thereby achieving higher safety. In an embodiment, the prying member 23 may be formed by welding two or more components, the prying member 23 may be formed by assembling two or more components, or the prying member 23 may be of other suitable structures, and is not limited thereto.

In an optional embodiment, a handle 34 is arranged at an end of the elongated arm 33 away from the head 32, and the handle 34 is made of a rubber material. In this way, the worker can use the prying member 23 to dismount the tire more easily, and the occurrence of injuries to the worker can be reduced, thereby achieving higher safety. In an embodiment, it is possible to use the handle 34 made of other materials instead of the handle 34 made of the rubber material, or it is possible to provide no handle 34.

A tire mounting workflow of the tire mounting/dismounting device according to an embodiment of the present disclosure may be as follows.

1. The hub is first placed at a designated position above the housing 14, to facilitate fixing of the hub by means of the retaining member 18.
2. The tire mounting structure 8 is mounted on the rotating structure 7, and the positional height of the tire mounting component is adjusted by using the adjusting structure 11, so that the positional height of the tire mounting component matches the size of the hub.
3. Lubricating oil is applied to an inner edge of a tire to be mounted.
4. The driving device 6 is started, and the rotating structure 7 drives the tire mounting component to rotate.
5. The tire is placed obliquely, so that a lower inner edge portion of the tire is placed on the main body 1 and is in contact with the guide member 4. Under the action of the rotation of the tire mounting component, the guide member 4 moves along the lower inner edge of the tire, waiting for the mounting of the lower inner edge of the tire on the hub.
6. A side of the tire is pressed downward, so that the positional height of the pressing member 2 exceeds the positional height of a side of an upper inner edge of the tire. In this process, due to the arrangement of the protective member 3, the protective member 3 can preferentially be in contact with the upper inner edge of the tire to prevent the upper inner edge of the tire from being stuck on the pressing member 2, thereby preventing the tire from being damaged due to the fact that the tire is stuck on the pressing member 2.

7. The pressing member 2 is pressed on the side of the upper inner edge of the tire, and the rotating structure 7 drives the tire mounting component to rotate. The guide member 4 moves along the upper inner edge of the tire, and the pressing member 2 can move along the upper inner edge to gradually press the entire upper inner edge of the tire downward, waiting for the mounting of the upper inner edge of the tire on the hub, thus completing the mounting of the tire.

A tire dismounting workflow of the tire mounting/dismounting device according to an embodiment of the present disclosure may be as follows.

1. A tire to be dismounted and the hub are placed at a designated position above the housing 14, to facilitate fixing of the hub by means of the retaining member 18.
2. The supporting portion 12 of the first mounting portion 9 is dismounted and mounted on the rotating structure 7, the supporting seat 22 is mounted on the supporting portion 12, and the positional height of the supporting seat 22 is adjusted by using the fixing structure 29, so that the positional height of the supporting seat 22 matches the size of the tire and the size of the hub.
3. Lubricating oil is applied on the arc-shaped surface of the prying member 23.
4. The head 32 of the prying member 23 is inserted between an upper inner edge of the tire and the hub, and then pries up, such that the elongated arm 33 of the prying member 23 is placed in the retaining groove 27 of the supporting seat 22 and between the baffles 28 on the two sides of the top of the supporting arm 26. In this case, the arc-shaped surface of the head 32 of the prying member 23 abuts against an inner wall of the tire.
5. The handle 34 is manually grasped to rotate the prying member 23, such that the prying member 23 moves along the upper inner edge of the tire, and the prying member 23 gradually pries up the entire upper inner edge of the tire.
6. The prying member 23 is taken out, and the head 32 of the prying member 23 is inserted between a lower inner edge of the tire and the hub, and then pries up, such that the elongated arm 33 of the prying member 23 is placed in the retaining groove 27 of the supporting seat 22 and between the baffles 28 on the two sides of the top of the supporting arm 26. In this case, the arc-shaped surface of the head 32 of the prying member 23 abuts against an outer wall of the tire.
7. The handle 34 is manually grasped to rotate the prying member 23, such that the prying member 23 moves along the lower inner edge of the tire, and the prying member 23 gradually pries up the entire lower inner edge of the tire, thus completing the dismounting of the tire.

Those skilled in the art can freely combine and use the above additional technical features provided that no conflict occurs.

The foregoing implementations are only preferred implementations of the present disclosure and cannot be used to limit the scope of protection of the present disclosure. All non-essential modifications and substitutions made by those skilled in the art on the basis of the present disclosure shall fall within the scope of protection of the present disclosure.

What is claimed is:

1. A tire mounting component, comprising a main body with a flat top and rounded sides and a pressing wheel capable of pressing down the tire, wherein the pressing wheel is arranged on one side of the flat main body;
   a protective member is arranged on the one side of the main body, the protective member is at least partially located above the pressing wheel, wherein the top of the protective member has an arc-shaped surface and one end of the protective member that is closest to the main body has a greater dimension in a direction extending away from the pressing wheel than the other end of the protective member that is furthest away from the main body and slopes downward from on end to the other end;
   the protective member prevents the inner edge of the tire from coming into contact with the at least a portion of the top surface of the pressing wheel based on the inner edge of the tire sliding along the arc-shaped top of the protective member;
   a guide member positioned on top of the main body; and
   a reinforcing rib extending upwardly from the top of the main body, wherein the reinforcing rib extends from the guide member to the protective member, wherein the upper surface of the guide member and the reinforcing rib includes an surface that slants downward toward the pressing wheel.

2. The tire mounting component according to claim 1, wherein the guide member includes an arc-shaped portion on the flat top of the main body and is configured to contact with inner edge of the tire as the tire sits on the top of the flat main body.

3. The tire mounting component according to claim 2, wherein an end of the reinforcing rib close to the pressing wheel is curved and extends from the protective member to the arc-shaped portion.

* * * * *